E. SCHNEIDER.
RESILIENT DRIVING COUPLING.
APPLICATION FILED SEPT. 25, 1912.

1,125,739.

Patented Jan. 19, 1915.
3 SHEETS—SHEET 1.

E. SCHNEIDER.
RESILIENT DRIVING COUPLING.
APPLICATION FILED SEPT. 25, 1912.

1,125,739.

Patented Jan. 19, 1915.
3 SHEETS—SHEET 3.

UNITED STATES PATENT OFFICE.

EUGÈNE SCHNEIDER, OF LE CREUZOT, FRANCE.

RESILIENT DRIVING-COUPLING.

1,125,739.  Specification of Letters Patent.  Patented Jan. 19, 1915.

Application filed September 25, 1912. Serial No. 722,365.

*To all whom it may concern:*

Be it known that I, EUGÈNE SCHNEIDER, of Le Creuzot, Saone-et-Loire, France, have invented new and useful Resilient Driving-Couplings, which are fully set forth in the following specification.

The present invention relates to an improved device for resiliently assembling the two elements of a wheel, that is to say, the central portion and the peripheral portion. This same device is applicable also for resiliently coupling two shafts, one of the elements (the inner element) integral with one of the shafts being the equivalent of the hub or central wheel element while the other (the peripheral element) is integral with the other shaft.

In accordance with the invention the wheel hub or central member carries on its periphery a series of equidistant spindles upon each of which a roller is able to rotate freely, while the rim or outer element of the coupling is internally provided with a series of recesses arranged in the arc of a circle, their number corresponding to that of the rollers of the inner element and initially concentric with the said rollers. The intersections of these recesses are suitably rounded off. The annular space between the rollers and the inner recessed periphery of the rim is substantially filled by a free resilient band of solid or hollow indiarubber for example. The inner and outer elements thus mutually drive each other by means of the resilient band compressed between them with possible relative displacements both radially and angularly, all these displacements exclusivly producing the rotation of the rollers without any slipping friction upon the resilient band.

Figure 1:
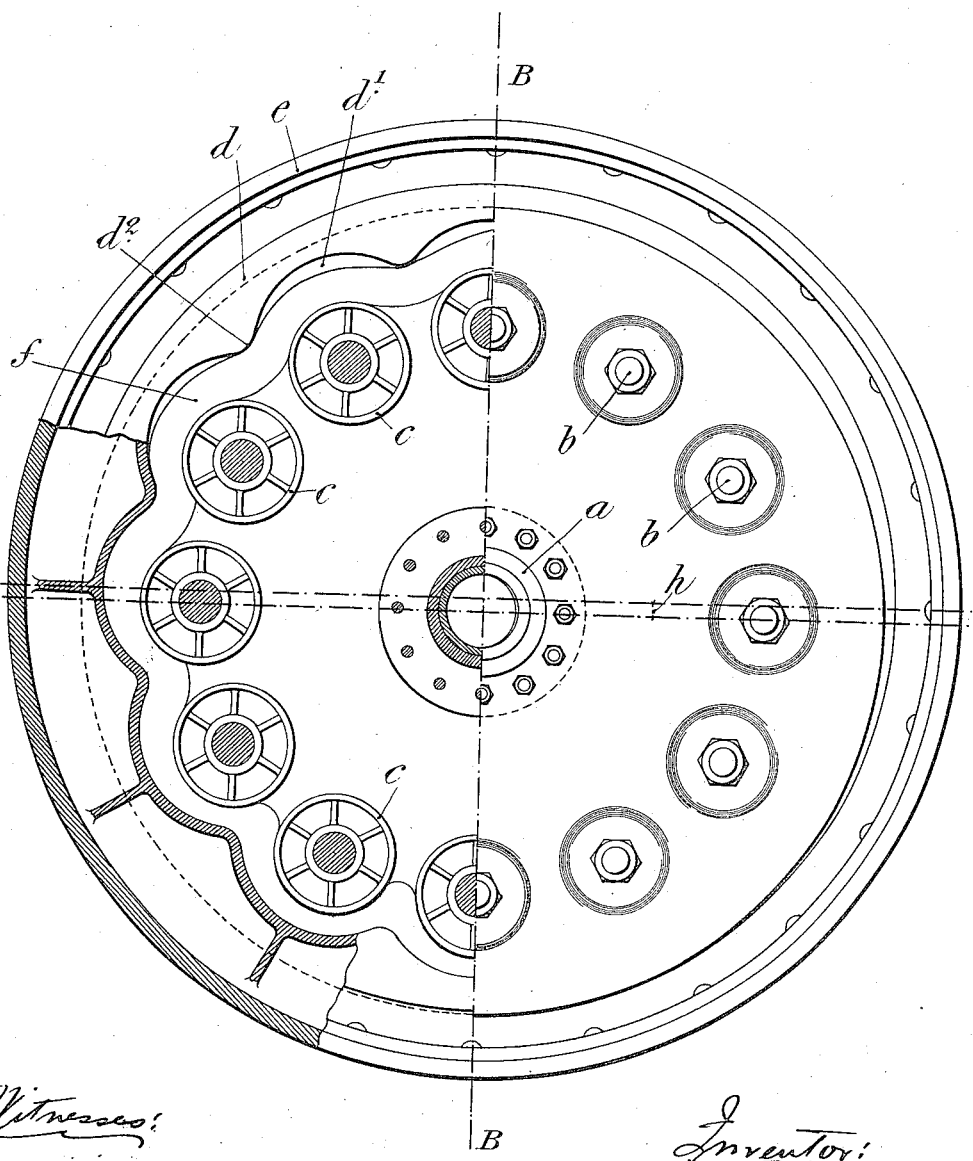
Figure 2:
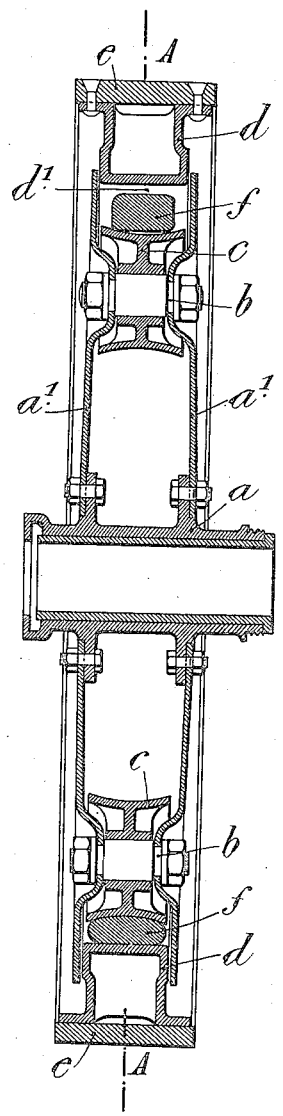
Figures 3, 4:
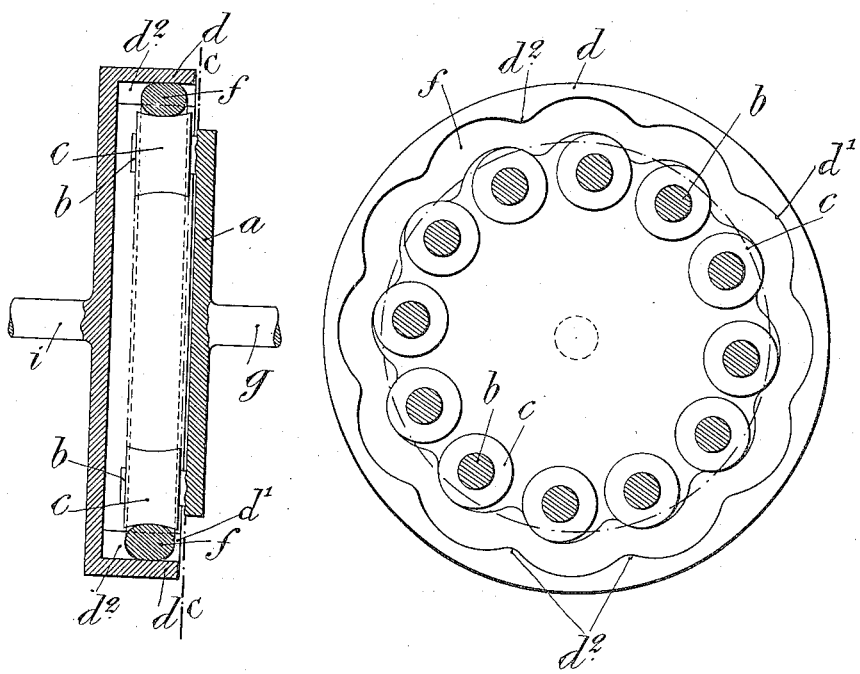

Figures 1 and 2 of the accompanying drawing illustrate the application of the invention to the construction of a vehicle wheel. Fig. 1 is a side elevation of the wheel partly broken away and shown in section. Fig. 2 is a sectional elevation on the line B—B in Fig. 1. Figs. 3 and 4 show respectively in longitudinal section and in cross section on the line C—C in Fig. 3 the application of the invention to the coupling of two shafts, the axes of which are in alinement.

Referring to Figs. 1 and 2 of the above drawings, the wheel hub proper $a$ carries two sheet metal cheeks or flanges $a'$ which serve as supports or bearings for a series of equidistant spindles $b$ upon which rollers $c$ are able to freely rotate. The outer element, that is to say, the rim $d$ carrying the tire $e$ externally is provided on its inner edge with a series of arcuate recesses $d'$ the number of which correspond to that of the rollers $c$, the said recesses being initially (at the time of assembling) concentric with the said rollers. The intersection between two consecutive recesses is rounded off as shown at $d^2$ in Fig. 1. Between the inner recessed periphery of the rim and the rollers $c$ a resilient band $f$ is arranged so that it follows a sinuous contour in tangential contact with the recesses and the grooves of the rollers.

Normally, under the influence of a load, the elements of the coupling occupy the position indicated in Fig. 1; the band $f$ is compressed between the lower rollers and the portion of the rim adjacent to the point of support upon the ground while at the upper part a separation corresponding to the displacement $h$ of the hub $a$ relatively to the rim $d$ is effected. In this displacement the rollers $c$ adjacent to the horizontal plane have moved vertically in running on the interposed resilient band. In the rotation of the wheel the band $f$ becomes compressed in the vertical plane beneath the rollers which pass in succession in this plane, any angular effort between the hub carrying the rollers and the rim resulting in rotations of the rollers upon the band $f$ without any slip taking place.

Referring now to the arrangement illustrated in Figs. 3 and 4, at its end one of the shafts $g$ carries the inner element $a$ of the coupling; this element may be constituted by a simple plate projecting laterally toward the other shaft $i$, carrying a series of equidistant spindles $b$ upon which rollers $c$ rotate freely. The other shaft $i$ carries the outer element of the coupling. This element may be constituted by a sleeve or cup $d$, the inner wall of which is formed with recesses $d'$ similar to those in the preceding example. The resilient band $f$ is arranged between these recesses and the rollers $b$.

Under the influence of a driving couple of one of the elements relatively to the other, as soon as the angular displacement occurs the rollers cease to be concentric with the recesses and the resilient band $f$ is compressed, the rollers rotating without "slip."

It should be noted that in this application the coupling described permits of effecting easy starting. It also constitutes a safety device in case the driving couple should exceed a predetermined value. In this case the rollers pass over the projections $d^2$ between the recesses $d'$ merely crushing in their passage the resilient band $f$.

What I claim and desire to secure by Letters Patent of the United States is:—

1. In a device of the character described, a shaft having a hub member fast thereto, a plurality of revoluble rollers mounted on said hub and arranged equidistant from the shaft, a rim member surrounding said rollers and having recesses opposite said rollers, and a resilient continuous band held in said recesses by said rollers for transmitting power between the driving and driven parts.

2. In a device of the character described, a shaft having a hub member fast thereto, a plurality of revoluble rollers mounted on the periphery of said hub, a rim member surrounding said rollers and having arc-shaped recesses opposite said rollers, and a resilient continuous band held in said recesses by said rollers for transmitting power between the driving and driven parts.

In testimony whereof, I have signed this specification in the presence of two subscribing witnesses.

EUGÈNE SCHNEIDER.

Witnesses:
HANSON C. COXE,
R. DE SERELINGER.